United States Patent [19]

Roullier et al.

[11] 4,202,578

[45] May 13, 1980

[54] DEVICE FOR AUTOMATIC LIFTING OF THE REAR PANEL OF AN AUTOMOBILE EQUIPPED WITH A TAILGATE

[75] Inventors: Lucien Roullier, Paris; Dominique Pastourel, Boissy, both of France

[73] Assignee: Regie Nationale des Usines Renault, Boulogne-Billancourt, France

[21] Appl. No.: 943,187

[22] Filed: Sep. 18, 1978

[30] Foreign Application Priority Data

Sep. 16, 1977 [FR] France ................... 77 28104

[51] Int. Cl.² .............................................. B60R 5/04
[52] U.S. Cl. .................................. 296/37.16; 49/414; 296/56; 296/106
[58] Field of Search ............... 296/37.16, 100, 106, 296/57 R, 56; 49/356, 414, 420

[56] References Cited

U.S. PATENT DOCUMENTS

| 3,181,911 | 5/1965 | Péras | 296/106 |
| 3,950,025 | 4/1976 | Little | 296/56 |

Primary Examiner—Richard A. Bertsch
Assistant Examiner—John A. Carroll
Attorney, Agent, or Firm—Oblon, Fisher, Spivak, McClelland & Maier

[57] ABSTRACT

A spring-biased luggage panel covering the otherwise exposed luggage compartment of an automobile equipped with a rear tailgate. The panel is biased such that when the tailgate is opened, the luggage panel is automatically opened, and when the tailgate is closed, the panel is likewise automatically closed.

8 Claims, 2 Drawing Figures

DEVICE FOR AUTOMATIC LIFTING OF THE REAR PANEL OF AN AUTOMOBILE EQUIPPED WITH A TAILGATE

BACKGROUND OF THE INVENTION

1. Field of the Invention

The present invention relates to a device for facilitating access to the luggage compartment located in the rear of automobiles equipped with a tailgate in which a horizontal rear panel, frequently referred to as the rear space, can be raised and lowered automatically by opening and then closing the tailgate respectively.

2. Description of the Prior Art

Most systems for raising the tailgate rear panel are joined to the tailgate either directly by a simple detachable strap or indirectly by means of the tailgate's compensation and balance system, hinged calipers or telescopic equalizer.

These raising systems have the disadvantage of being either not very estheticly pleasing, bulky, of a high cost price, or sometimes dangerous as a result of projections, risk of unfastening the strap, obligatory raising of the panel at the same time as the tailgate, etc.

Another known system for raising a mounted pivoting panel between the back of the rear seat and the tailgate consists of lifting the panel by pivoting it on its front edge (in the direction of the vehicle) around pivots attached to the sides of the body of the vehicle by means of a spring working on traction over a lever arm hinged on the body, constantly tending to lift the panel along its rear edge.

In this way, when the tailgate is opened, the panel, which is not directly attached to the tailgate, will only be raised in the absence of objects placed on top of it, or if these objects are not too heavy.

When the tailgate is closed, the arms of the hinged equalizer calipers automatically lower the panel towards its horizontal position, opposing the action of the traction spring.

SUMMARY OF THE INVENTION

Using the same general operating principle, it is accordingly an object of this invention to provide a novel device for automatically raising the panel, which is simple in connection, involving a minimum of quickly installed parts, and applicable on all vehicles equipped with a rear tailgate, whatever the equalizer system employed.

This and other objects are achieved according to the invention by providing a novel device for access to the luggage compartment located in the rear of automobile equipped with a rear tailgate hinged on the upper part of the vehicle body and balanced by an appropriate compensation system in which a panel in one or more parts, extending horizontally between the back of the rear seat and the tailgate, can be automatically raised while pivoting on its front edge by elastic means released when the tailgate is opened and can be automatically lowered towards its horizontal position, against the action of the elastic lifting means, by closing the tailgate, characterized by the fact that the elastic lifting means are formed, on at least one side of the panel, by a torsion spring wound around the panel's pivot, one end of which is supported on a lateral strut of the body and the other of which is supported under the panel.

Closing the tailgate causes the lowering of the panel by direct application of the interior of the tailgate on at least one lug, preferably a rubber roller, protruding in relationship to the lateral sides of the panel near its rear edge.

In a preferred version, the panel is divided into two parts, a fixed front panel and a mobile rear panel extending to the tailgate. The common axis, located basically at right angles to the separation between the two panels, thus serves both as support for the rear edge of the front panel, as support for the torsion spring and as pivot for the front edge of the rear panel, acted on by the action of the spring.

The device according to the invention is discrete and esthetic, since no parts of the mechanism are in view, either from the outside of the vehicle or when the tailgate is opened for access to the trunk. In fact, the lug for lowering the panel is hidden under the tailgate frame, while the spring and the various fasteners are hidden under the panel itself.

A judicious calibration of the spring permits reasonably raising the panel from an angular displacement lower than that of the tailgate, in the absence of a heavy object deposited on the panel. Otherwise, the panel must be able to be kept basically horizontal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
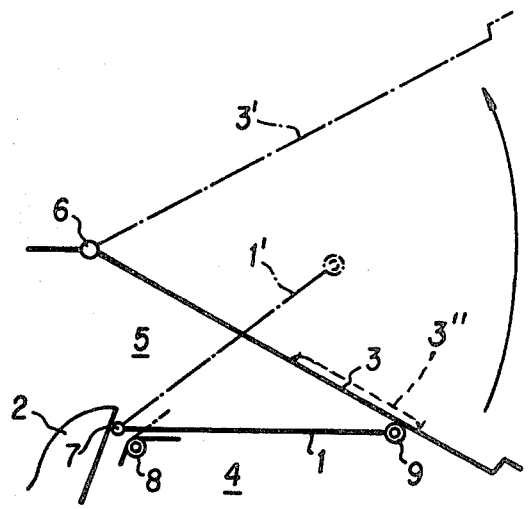
FIG. 1 is a schematic representation of the operational principle of the automatic raising and lowering of the panel as a function of the tailgate's position.

Referring now to the drawings, wherein like reference numerals designate identical or corresponding parts throughout the several views, and more particularly to FIG. 1 thereof, it is there seen the rear space of an automobile, consists of a panel 1 in one or more parts extending horizontally between the upper part of the back of the rear seat 2 and the tailgate 3 to separate the luggage compartment 4 from the vehicle's interior 5.

The tailgate 3 is hinged in the conventional manner on the upper side 6 of the body so that it can be raised to position 3' represented by stippling and held in that position by any equalizer system (not shown), for example hinged calipers or telescopic equalizers mounted between the tailgate and the body sides.

According to a known principle, opening the tailgate releases an elastic part which constantly tends to cause the panel to pivot around its hinged axis 7 and to maintain it in this position 1' represented in stippling. Conversely, closing the tailgate 3 lowers the panel 1, recharging the elastic part for the following opening maneuver.

According to the present invention, the elastic lifting part is achieved by a torsion spring 8 placed near the front edge of the panel. Lowering of the panel is ensured by direct application of the inside frame of the tailgate 3 on a protruding lug 9 placed near the rear edge of said panel. The lowering takes place independently of the equalizer system of the tailgate, which can thus be any system.

Figure 2:
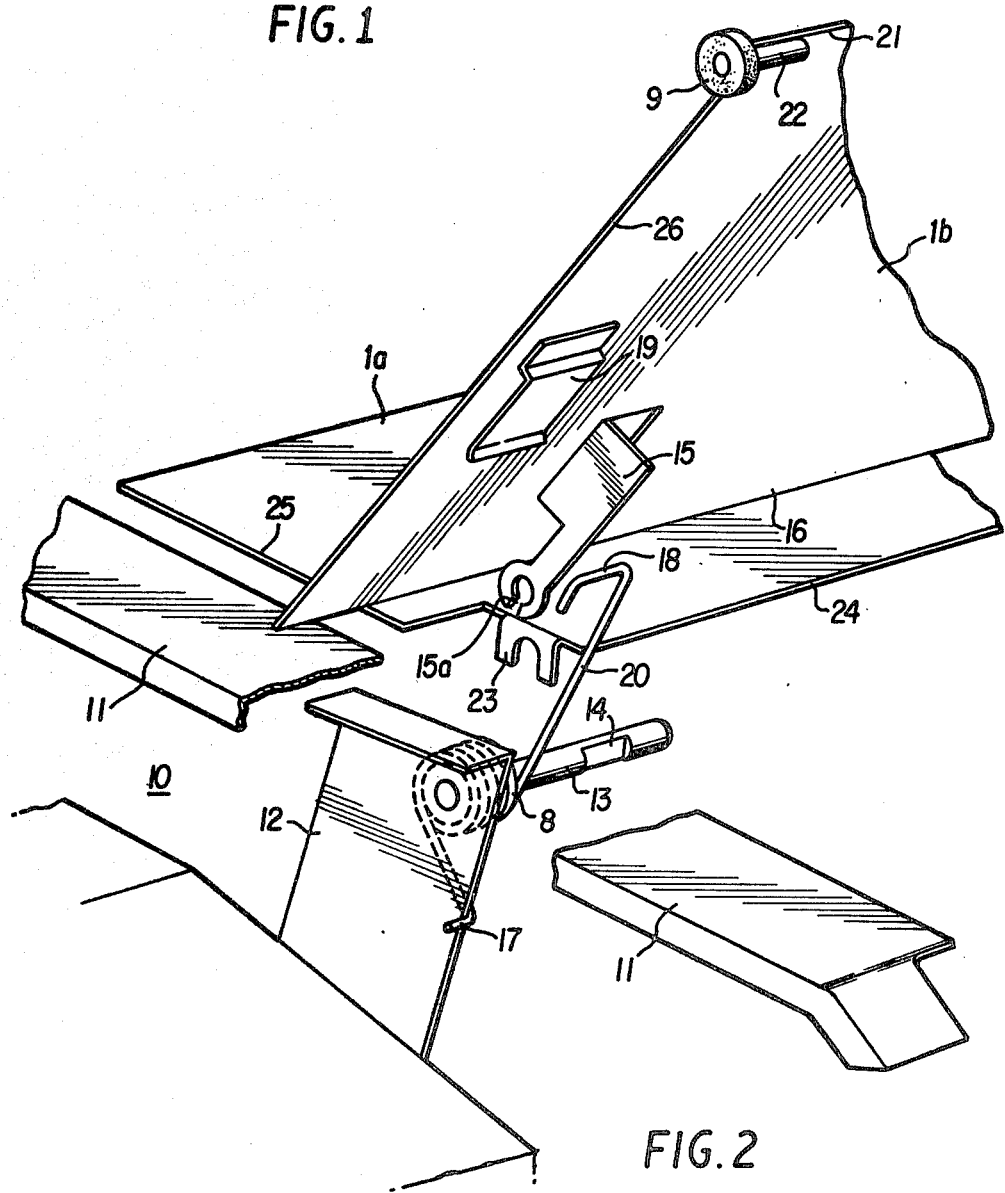
FIG. 2 is an enlarged view in split perspective of the automatic lifting device applied to a two-part panel, according to the invention.

FIG. 2 represents a preferred version with a panel in two parts 1a, 1b, respectively a fixed front panel 1a and a pivoting rear panel 1b, it being understood that the lifting device to be described imparts its effect on the mobile panel 1b which can thus be single.

In FIG. 2 there is seen the left side 10 of the rear compartment of an automobile, which is equipped on each side with a lateral bracket such as 11 and a lateral body strut 12.

When the tailgate 3 (not shown) is closed, the panel or panels 1a, 1b are in the same plane, at the level of the fixed lateral brackets 11, so that the contents of the luggage compartment can not be seen from the outside through the vehicle's rear window.

Perpendicular to each lateral strut 12 is mounted an axle or pivot 13, partially camouflaged under the lateral bracket 11.

On the end of the axle located towards the interior of the compartment, a flat portion 14 permits the engagement of a notched flange 15, connected under the rear panel 1b near its front edge 16. The flange 15 is provided with a notch 15a, the size of which is equal to the reduced thickness of the axis at the site of the flat 14, such that the panel 1b can only be mounted on its pivots or axles 13 in a certain angular position. Then the panel 1b can freely pivot around the axles 13.

At least one of the axles also serves as support for a torsion spring 8 wound near the lateral strut 12, the first end 17 of which is curved back so as to be supported by the fixed strut 12 of the body and the other end 18 of which is supported under the panel 1b near its front edge 16.

For this purpose, said end is curved in an L-shape, parallel to the panel's plane, and is engaged in a freely displaced way between the panel 1b and an open flange 19 connected under the panel. The torsion of the spring 8 applied to the lever arm 20 of this end causes the panel to pivot with sufficient incline to improve access to the compartment.

The panel is furthermore furnished near its rear edge 21 with a lug member 9 protruding in relation to its edge 26, intended to cooperate with the corresponding inside edge of the tailgate's frame when the latter is lowered for closing.

In FIG. 2, this lug member appears as a rubber wheel freely turning about an axle 22 connected under the panel 1b.

The rolling track of this wheel is thus formed, as we have seen, either directly by the tailgate frame or by a groove 3 produced by stamping, for example.

Another version, not shown, consists of replacing the wheel by a slide block hinged about the axis and guided in a channel or rail mounted on the tailgate or integrally produced in the tailgate by stamping thereof.

In the case of a rear space formed by two parts, the fixed front panel 1a can be advantageously rest on the pivots 13 of the rear panel 1b by means of a fork 23 connected under the sides of the front panel 1a, near its rear edge 24. The fixed panel 1a is furthermore maintained either by its sides 25 against the lateral brackets 1' or against the back of the rear seat 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the Unites States is:

1. A device for access to the luggage compartment located in the rear of an automobile comprising:
   a rear tailgate hingedly connected to an upper part of the rear of said automobile for movement to an upper, open position and to a lower, closed position balanced by an appropriate compensation system;
   a panel provided with front and rear edge portions and lateral sides defining a plane, said panel being mounted horizontally between a rear seat of said automobile and said tailgate with said rear edge portion engaging said tailgate in said lower, closed position;
   elastic means for automatically raising said panel while pivoting on the front edge thereof located away from said tailgate, said panel being lowered automatically against the action of said elastic means upon closing of said tailgate;
   at least one lateral strut mounted on at least one side of said vehicle; and
   said elastic means comprising at least one torsion spring mounted near at least one side of said panel, said at least one spring having two ends, one end of which is supported on said lateral strut, and another end of which is supported against said panel and in engagement therewith.

2. A device for access to the luggage compartment in the rear of an automobile equipped with a rear tailgate hingedly connected to an upper part of the rear of said automobile and balanced by an appropriate compensation system, wherein a panel is provided with front and rear edges and lateral sides defining a plane, said panel being mounted horizontally between a rear seat of said automobile and said tailgate and raised automatically while pivoting on the front edge thereof located away from tailgate by elastic means releasable upon opening of said tailgate, said panel being lowered automatically against the action of said elastic means upon closing of said tailgate, said device comprising:
   at least one lateral strut mounted on at least one side of said vehicle; and
   said elastic means comprising at least one torsion spring mounted near at least one side of said panel, said spring having two ends, one end of which is supported on said lateral strut, and another end of which is supported against said panel and in engagement therewith, said another end of said spring curved in an L-shape and mounted parallel to the plane of said panel; and,
   a flange attached to said panel adjacent said spring, said L-shaped another end of said spring disposed in said flange such that said L-shaped another end is freely displaceable therein.

3. A device according to claim 2, further comprising:
   a pivoting axle disposed generally perpendicular to the sides of said automobile and to said at least one strut, said spring being mounted on said axle; and
   said panel having attached to the sides thereof a pair of notched flanges each having a notch portion pivotally connected to said axle and a flange connected to said panel near said front edge thereof such that said panel pivots around said axle by means of said notched flange.

4. A device according to claim 3, wherein said panel comprises:

a front immovable panel having a front and rear edge and lateral sides, said front panel comprising a pair of forks mounted on the sides and near the rear edge thereof, said forks engaging said axle such that said front panel is supported by said axle; and, a rear pivotably movable panel having front and rear edges and lateral sides, said rear movable panel mounted to pivot on said axle at the first edge thereof by means of said elastic means, said axle and said notched flange.

5. A device for access to the luggage compartment in the rear of an automobile equipped with a rear tailgate hingedly connected to an upper part of the rear of said automobile and balanced by an appropriate compensation system, wherein a panel is provided with front and rear edges and lateral sides defining a plane, said panel being mounted horizontally between a rear seat of said automobile and said tailgate and raised automatically while pivoting on the front edge thereof located away from said tailgate by elastic means releasable upon opening of said tailgate, said panel being lowered automatically against the action of said elastic means upon closing of said tailgate, said device comprising:

at least one lateral strut mounted on at least one side of said vehicle; and said elastic means comprising at least one torsion spring mounted near at least one side of said panel, said spring having two ends, one end of which is supported on said lateral strut, and another end of which is supported against said panel and in engagement therewith wherein the rear edge of said panel is disposed in the vicinity of said tailgate, and wherein said tailgate is provided with an inside frame, further comprising lug means attached under said panel near said rear edge thereof and protruding outwardly in relation to the sides of said panel whereby closing of said tailgate causes lowering of said panel by direct application of said inside frame and said tailgate against said lug means.

6. A device according to claim 5, further comprising:

said lug means comprising a generally cylindrical roller turning on a fixed roller axis under said panel; and said inside tailgate frame comprising a rolling track formed therein for engagement with and guidance of said lug roller.

7. A device according to claim 5, further comprising:

said lug comprising a hinged side block; and, said inside tailgate frame comprising a guide rail provided on said inside frame such that said block guidingly travels within said rail during opening and closing of said tailgate.

8. A device according to claim 5, wherein said lug means comprises:

a rubber, generally cylindrical roller.

* * * * *